US010318099B2

(12) United States Patent
Gichuhi

(10) Patent No.: US 10,318,099 B2
(45) Date of Patent: *Jun. 11, 2019

(54) CAPTURING USER FEEDBACK OF SOFTWARE CONTENT IN A NETWORKED ENVIRONMENT AND CONTROLLING THE SOFTWARE USING A SINGLE ACTION

(71) Applicant: EventSQ LLC, McLean, VA (US)

(72) Inventor: Christopher M. Gichuhi, McLean, VA (US)

(73) Assignee: EVENTSQ LLC, McLean, VA (US)

( * ) Notice: Subject to any disclaimer, the term of this patent is extended or adjusted under 35 U.S.C. 154(b) by 585 days.

This patent is subject to a terminal disclaimer.

(21) Appl. No.: 14/667,484

(22) Filed: Mar. 24, 2015

(65) Prior Publication Data
US 2015/0293665 A1 Oct. 15, 2015

Related U.S. Application Data

(63) Continuation of application No. 13/077,648, filed on Mar. 31, 2011, now Pat. No. 9,021,394.
(Continued)

(51) Int. Cl.
G06F 3/048 (2013.01)
G06F 3/0481 (2013.01)
(Continued)

(52) U.S. Cl.
CPC ...... G06F 3/04812 (2013.01); G06F 3/04817 (2013.01); G06F 3/04842 (2013.01);
(Continued)

(58) Field of Classification Search
CPC ......... G06Q 10/10; G06Q 30/02; G06F 3/048
See application file for complete search history.

(56) References Cited

U.S. PATENT DOCUMENTS 5,960,411 A 9/1999 Hartman et al.
7,337,458 B2 2/2008 Michelitsch et al.
(Continued)

FOREIGN PATENT DOCUMENTS

KR 10-2007-0079211 A 8/2007

OTHER PUBLICATIONS

Final Office action dated Oct. 16, 2017, for U.S. Appl. No. 14/367,221, filed Dec. 3, 2014.
(Continued)

Primary Examiner — Rashawn N Tillery
(74) Attorney, Agent, or Firm — Perkins Coie LLP

(57) ABSTRACT

A system and method for capturing user feedback of content in a networked environment and controlling the software using a single action is disclosed. Feedback-software controls provide the user with a single interface that allows the user to simultaneously provide user review content while controlling the software displaying the content. The feedback-software controls eliminate the additional action(s) required to provide feedback and control software. By reducing the process of providing feedback and controlling software into a single action, the feedback-software controls increase the probability that a user will provide feedback. This increased feedback can result in improved recommendations given to users and insightful feedback for content providers or merchants. Another advantage provided by the feedback-software controls is that a viewer can easily provide feedback on all of the displayed content or can simply provide feedback on smaller portions of the content, e.g., a specific link provided on a webpage.

32 Claims, 17 Drawing Sheets

Related U.S. Application Data

(60) Provisional application No. 61/320,135, filed on Apr. 1, 2010.

(51) Int. Cl.

| | | |
|---|---|---|
| *G06Q 10/10* | (2012.01) | |
| *G06Q 30/02* | (2012.01) | |
| *G06F 3/0484* | (2013.01) | |
| *G06F 3/16* | (2006.01) | |

(52) U.S. Cl.
CPC .......... *G06F 3/04847* (2013.01); *G06F 3/167* (2013.01); *G06Q 10/10* (2013.01); *G06Q 30/02* (2013.01); *G06F 2203/04803* (2013.01)

(56) References Cited

U.S. PATENT DOCUMENTS

| | | | |
|---|---|---|---|
| 7,613,717 | B1 | 11/2009 | Reed et al. |
| 7,756,970 | B2 | 7/2010 | Ebert et al. |
| 7,809,602 | B2 | 10/2010 | Nickerson et al. |
| 8,078,615 | B2 | 12/2011 | Smith et al. |
| 9,021,394 | B2 | 4/2015 | Gichuhi et al. |
| 2003/0195884 | A1 | 10/2003 | Boyd et al. |
| 2004/0169678 | A1 | 9/2004 | Oliver et al. |
| 2005/0021470 | A1 | 1/2005 | Martin et al. |
| 2005/0166148 | A1* | 7/2005 | Garding ................ G06F 9/4446 715/708 |
| 2005/0198128 | A1* | 9/2005 | Anderson ................ G06F 17/24 709/204 |
| 2005/0251437 | A1 | 11/2005 | Meuleman |
| 2007/0106672 | A1 | 5/2007 | Sighart et al. |
| 2009/0132916 | A1* | 5/2009 | Filatov ................ G06F 19/3406 715/700 |
| 2009/0144225 | A1 | 6/2009 | Saito et al. |
| 2010/0174623 | A1 | 7/2010 | McPhie et al. |
| 2011/0153663 | A1 | 6/2011 | Koren et al. |
| 2011/0246901 | A1 | 10/2011 | Gichuhi et al. |
| 2012/0245924 | A1 | 9/2012 | Brun et al. |
| 2015/0170172 | A1 | 6/2015 | Gichuhi et al. |

OTHER PUBLICATIONS

Non-Final Office Action dated Aug. 8, 2016 for U.S. Appl. No. 14/367,221 of Gichuhi, C., et al., filed Jun. 19, 2014.

Serrano, Iñigo et al., "Emtrics—demo Day Wayra Espana 2012", WAYRA Startups, [online video], Accessed at: <https://www.youtube.com/watch?v=cZ2gh9ZPwFs>, Jun. 30, 2012, 1 page.

Non-Final Office Action dated Apr. 17, 2017 for U.S. Appl. No. 14/367,221 of Gichuhi, C., filed Dec. 3, 2014.

Advisory Action dated Mar. 9, 2017, for U.S. Appl. No. 14/367,221 of Gichuhi, C., filed Dec. 3, 2014.

Final Office action dated Nov. 16, 2016, for U.S. Appl. No. 14/367,221 of Gichuhi, C., filed Dec. 3, 2014.

Non-Final Office Action in U.S. Appl. No. 13/077,648, dated Jun. 4, 2014, 14 pages.

Final Office Action dated Oct. 9, 2014 for U.S. Appl. No. 13/077,648.

Notice of Allowance in U.S. Appl. No. 13/077,648, dated Dec. 24, 2014, 7 pages.

International Search Report and Written Opinion dated Feb. 28, 2013 for International Application No. PCT/US2011/065928.

* cited by examiner

| | |
|---|---|
| << interesting, PREVIOUS | interesting, NEXT >> |
| << not interesting, PREVIOUS | not interesting, NEXT >> |
| << highly relevant, BACK | highly relevant, CLOSE |
| << relevant, BACK | relevant, CLOSE |
| << not relevant, BACK | irrelevant, CLOSE |
| << like, go Back | like, NEXT >> |
| << dislike, go BACK | dislike, NEXT >> |
| << ++ go BACK | CLOSE ++ |
| << + go BACK | CLOSE + |
| << - go BACK | CLOSE - |

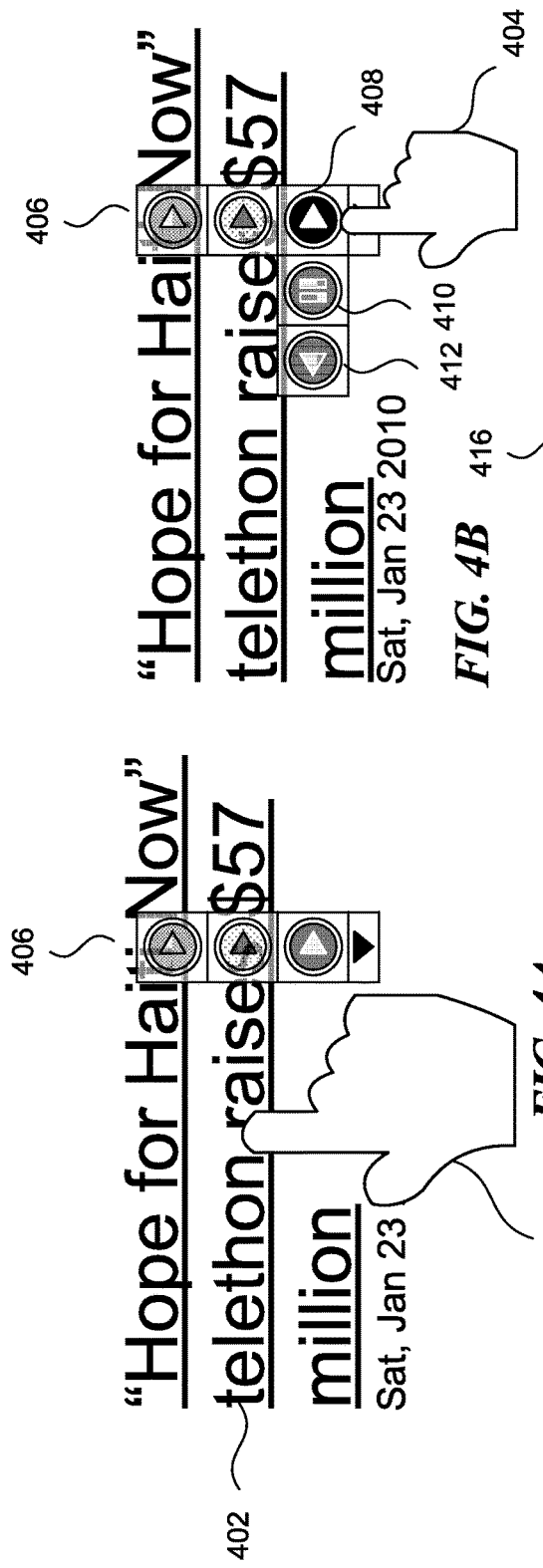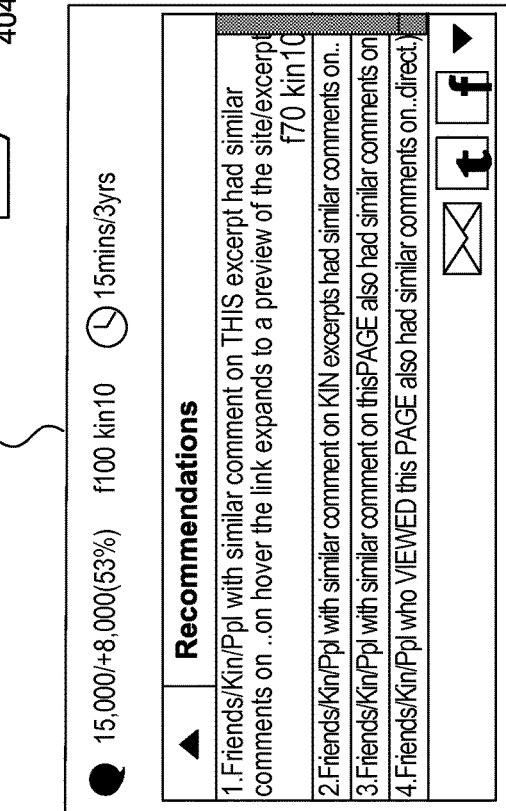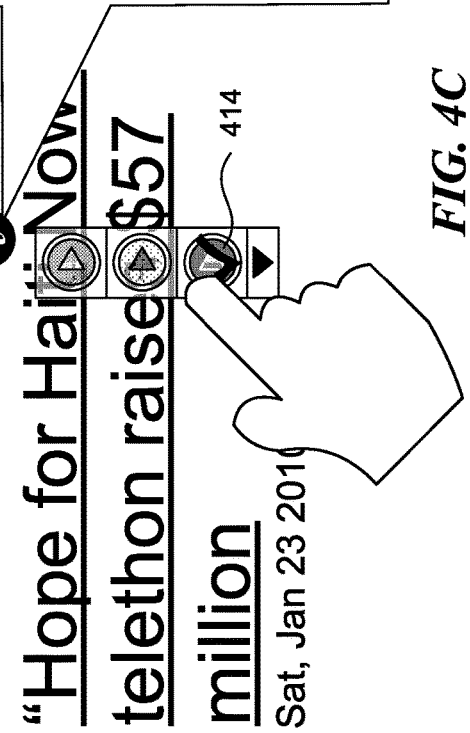
FIG. 4A
FIG. 4B
FIG. 4C

FIG. 10

CAPTURING USER FEEDBACK OF SOFTWARE CONTENT IN A NETWORKED ENVIRONMENT AND CONTROLLING THE SOFTWARE USING A SINGLE ACTION

CROSS-REFERENCE TO RELATED APPLICATIONS

The present application is a continuation application of U.S. Utility patent application Ser. No. 13/077,648, filed Mar. 31, 2011, which claims priority to U.S. Provisional Patent Application No. 61/320,135, filed Apr. 1, 2010; all of which are incorporated by reference herein in their entireties.

FIELD OF THE INVENTION

At least one embodiment of the present invention relates to capturing user feedback of content in a network environment and controlling the software used to present the content using a single action.

BACKGROUND

The rapid growth in the use of personal computers, data storage, and telecommunications has brought about a multimedia information era where digital image, audio, text, and video data are becoming the information formats of our worldwide society. The advent of the Internet has dramatically changed the manner in which people acquire and disseminate information and knowledge. Television broadcasters, newspaper publishers, entertainment companies, consumer product retailers, and service retailers are expanding their presence on the Internet. Personal computers, smart phones, and other network devices have become an information gateway for the consumer and are responsible for accessing and storing information from various sources, such as online newspapers, video and music Web sites, and broadcasters.

The multimedia information era is not limited to gathering information. Shopping, socializing, and many other everyday activities have moved to a network environment. With the almost limitless information available to the consumer, almost literally at their fingertips, it is difficult for the consumer to decide what information to access and where to access that information. In order to assist the consumer in finding the best source of information or the most suitable product, recommendation tools have been provided by various sources. Recommendation tools also provide information to assist merchants and content owners to provide the consumer with products and information that the consumer finds desirable. The recommendations from these tools are typically provided based on user feedback.

Using conventional feedback systems, users are required to provide feedback using a separate action and using separate controls from the controls and from the action required to control the software (or device). At a minimum, providing feedback and controlling the software/device is conventionally a two step process.

Typically, nearly ninety percent of users of a website, purchasers of a product on an e-commerce site, or users of multimedia content do not provide feedback. One of the reasons why users do not provide feedback is the extra time and effort required to provide feedback while using the software. Additionally, in most cases, there is no compelling incentive to encourage the user to provide feedback. Further, most conventional methods and systems do not provide effective methods for capturing user feedback for specific portions of content. This lack of participation leads to recommendations that are not as effective as they may potentially be.

SUMMARY

The techniques introduced here provide for capturing user feedback of content in a networked environment and controlling the software using a single action. Feedback-software controls provide the content viewer with a single interface that allows the viewer to simultaneously provide user review content while controlling the software displaying the content. The feedback-software controls eliminate the additional action(s) required to provide feedback and control software. By reducing the multiple actions of providing feedback and controlling software into a single action, the feedback-software controls increase the probability that a user will provide feedback. This increased feedback can result in improved recommendations given to users and insightful feedback for content providers or merchants. Another advantage provided by the feedback-software controls is that a viewer can easily provide feedback on all of the displayed content or can simply provide feedback on smaller portions of the content, e.g., a specific link provided on a webpage.

Other aspects of the techniques summarized above will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements.

FIGS. 4A-4C are example diagrams of a user interacting with feedback-control software.

FIG. 10 is an example diagram of a user interacting with an advanced feedback feature of the feedback-software controls on a shopping site.

DETAILED DESCRIPTION

References in this specification to "an embodiment," "one embodiment," or the like, mean that the particular feature, structure or characteristic being described is included in at least one embodiment of the present invention. Occurrences of such phrases in this specification do not necessarily all refer to the same embodiment.

Those of skill in the art will appreciate that the invention may be embodied in other forms and manners not discussed below. It is understood that the use of relational terms, if any, such as first, second, top and bottom, and the like are used solely for distinguishing one entity or action from another, without necessarily requiring or implying any such actual relationship or order between such entities or actions.

Figure 1A:
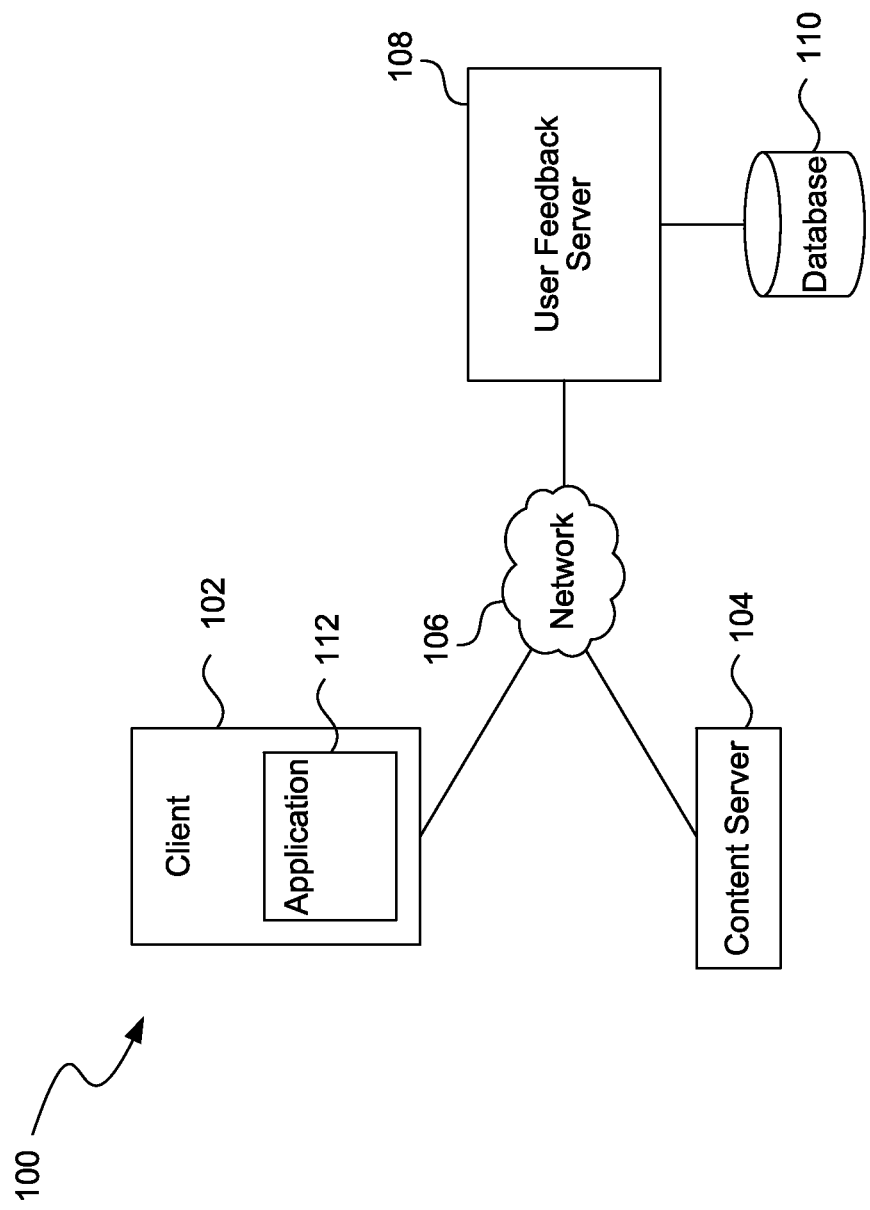
FIG. 1A is a block diagram of an example network environment in which the techniques described herein can operate.

FIG. 1A is a block diagram of an example network environment in which the techniques described herein can operate. The example environment includes at least one client 102, at least one content server 104, a network 106, a user feedback server 108, and a database 110 coupled with the system. In other embodiments the elements of FIG. 1A can be combined or omitted. For example, the content server 104 and the client 102 can be a single machine or can be connected directly without running through a network. Elements necessary for the environment to function that are well known to one skilled in the art are not shown.

Figure 11:
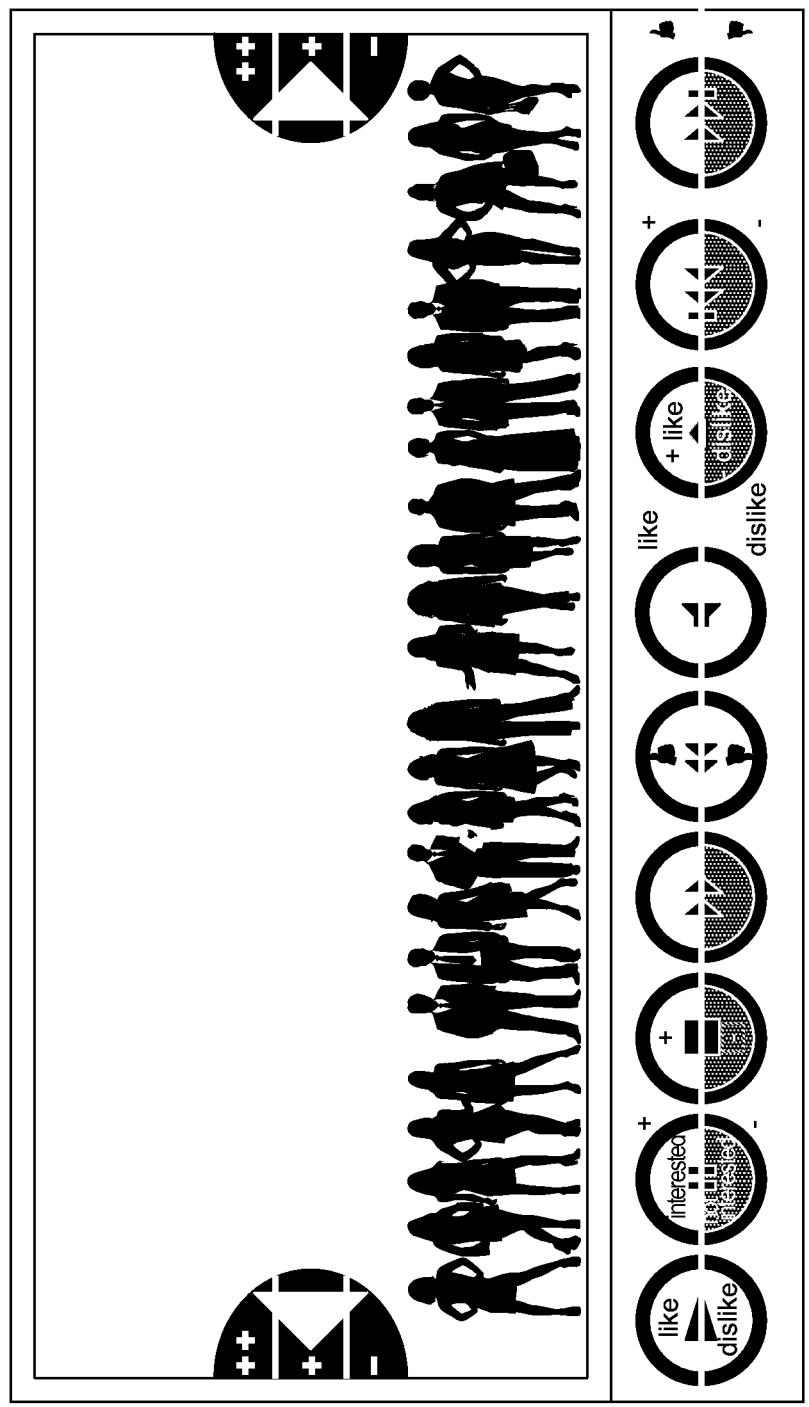
FIG. 11 is a diagram of an example of a media application including feedback-software controls.
Figure 12:
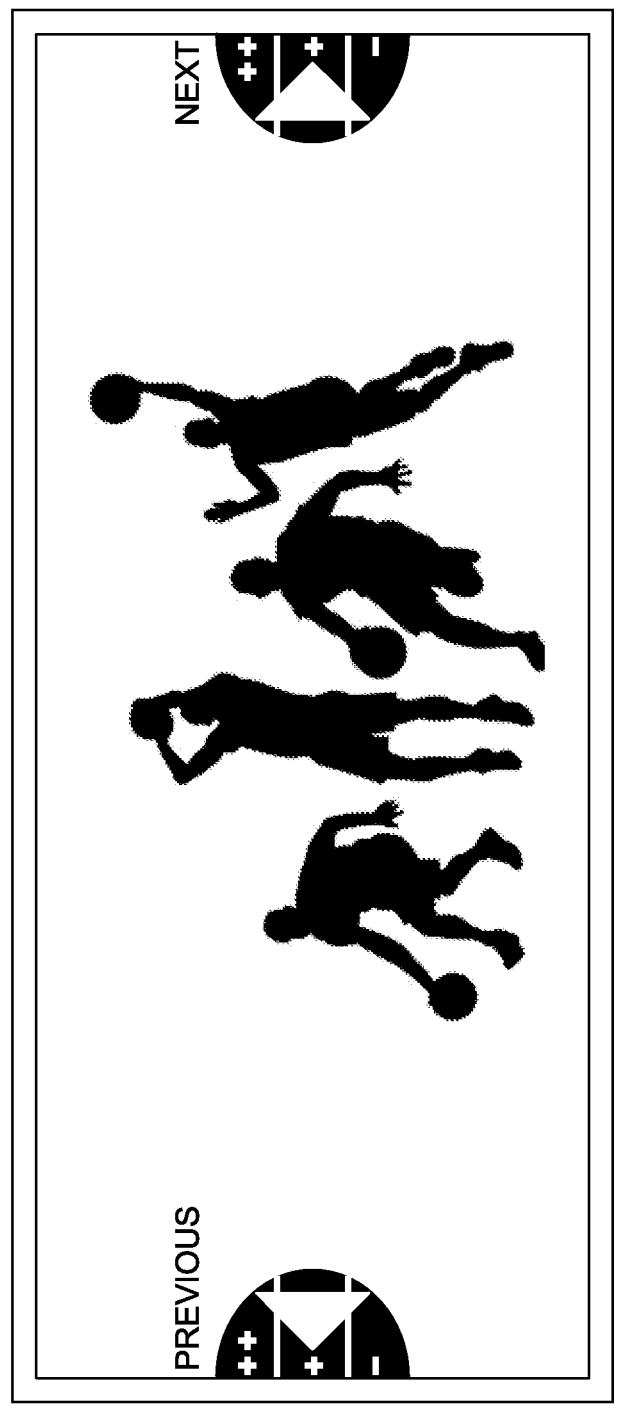
FIG. 12 is a diagram of an example picture/photo viewer including feedback-software controls.

In the example of FIG. 1A an application 112 is running on the client system 102. The application 112 can present content to a user of the client system 102. The application 112 can be, for example, an internet browser or a media application (e.g., a video player, an audio player, or a picture/photo viewer). In some examples, the application provides controls to the user to navigate through the content being displayed. In one embodiment, feedback-software controls can be built directly into the client application 102. A purpose built client system can, in some examples, present content to a user without a special application, for example, a television and the feedback-software controls can be built directly into the system. FIG. 11 is a diagram of an example of a media application including feedback-software controls. FIG. 12 is a diagram of an example picture/photo viewer including feedback-software controls.

Feedback-software controls as used herein includes the interface through which a user provides feedback and controls the software (e.g., application) which presents the content. In some examples, the feedback-software controls include feedback mechanisms that are integrated with the application's native controls. In other examples, the feedback-software controls provide an interface to control the application independent of the application's native controls.

In the example of FIG. 1A, the application 102 includes an integrated feedback-software controls user interface. The application 102 includes a mechanism, e.g., an event listener, to monitor user interaction with the feedback-software controls user interface. In response to detecting that the user has engaged the feedback-software controls user interface, the application also provides a mechanism to capture and send user feedback to the user feedback server.

Figure 1B:
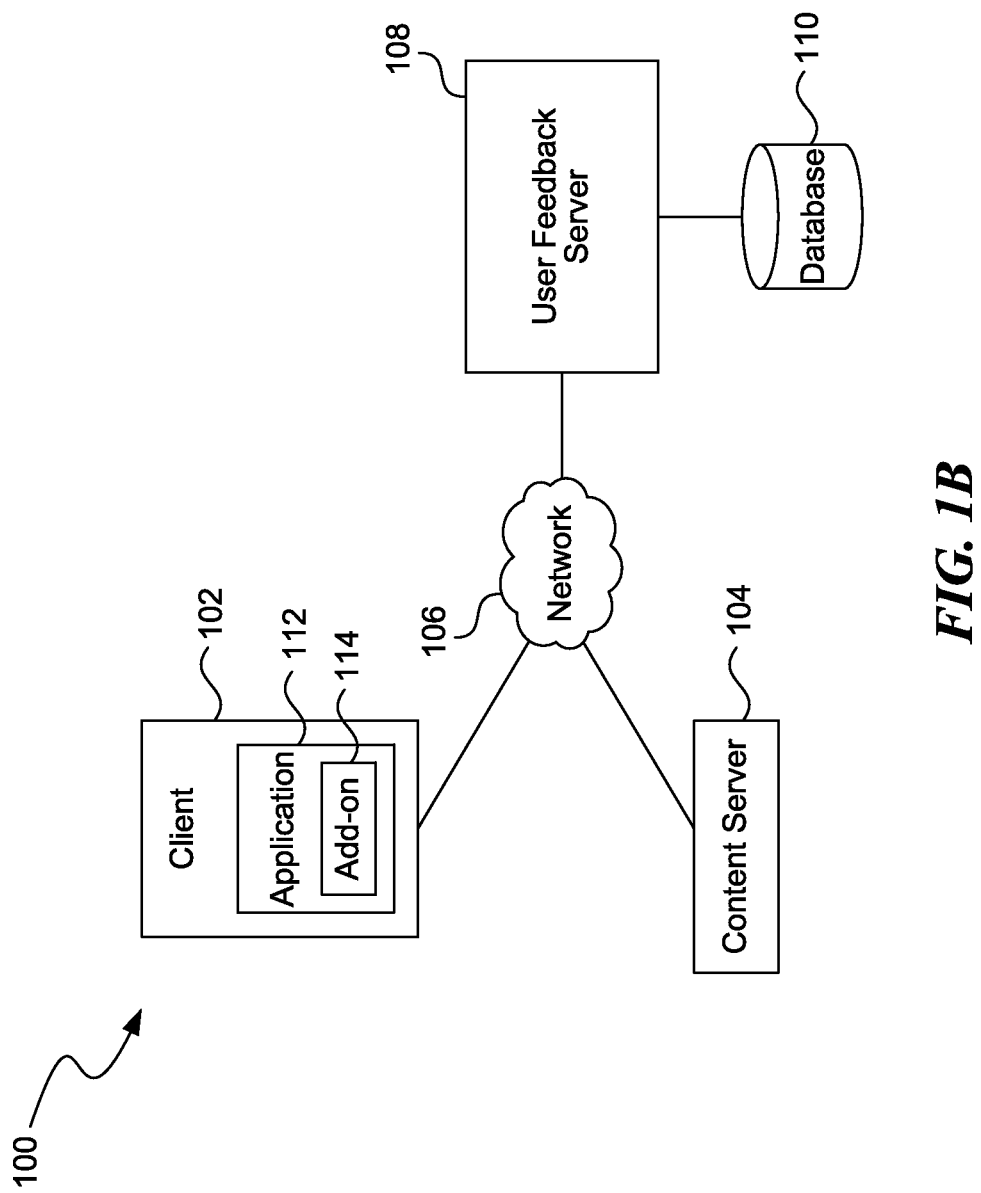
FIG. 1B is a block diagram of an example network environment including a client application add-on in which the techniques described herein can operate.

FIG. 1B is a block diagram of an example network environment including a client application add-on 114 in which the techniques described herein can operate. In one embodiment, the feedback-software controls can be implemented as an add-on 114 (e.g., a plug-in or extension) to the client application 112. In the example of FIG. 1B, the add-on 114 implements the feedback-software controls user interface. The add-on 114 includes a mechanism, e.g., an event listener, to monitor user interaction with the feedback-software control interface. In response to detecting that the user has engaged the feedback-software controls, the add-on 114 also provides a mechanism to capture and send user feedback to the user feedback server 108. In some examples, the add-on 114 also provides a mechanism to control the client application 112.

Figure 1C:
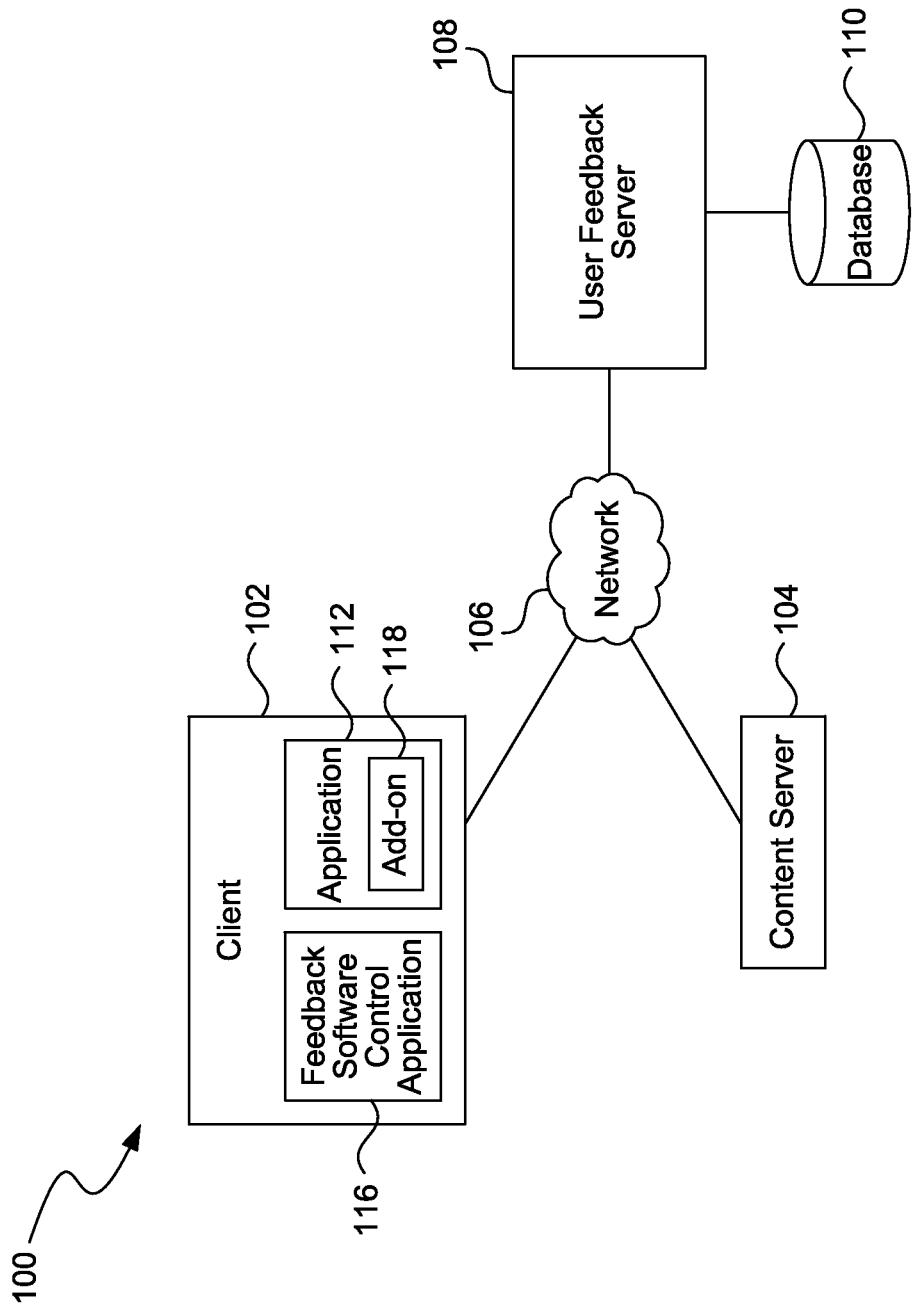
FIG. 1C is a block diagram of an example network environment including a stand alone application in which the techniques described herein can operate.

FIG. 1C is a block diagram of an example network environment including a stand alone application in which the techniques described herein can operate. In one embodiment, the feedback-software controls can be implemented as a stand alone application 116 that interfaces with the client application 112. In the example of FIG. 1C, the stand alone application 116 implements the feedback-software controls user interface. In one embodiment, the stand alone application 116 includes a mechanism, e.g., an event listener, to monitor user interaction with the feedback-software control interface. In response to detecting that the user has engaged the feedback-software controls, the stand alone application 116 also provides a mechanism to capture and send user feedback to the user feedback server 108. In some examples, the stand alone application 116 also provides a mechanism to control the client application 112.

In another embodiment, the stand alone application 116 implements the feedback-software controls user interface and an application add-on 118 includes a mechanism, e.g., an event listener, to monitor user interaction with the feedback-software control interface. In response to detecting that the user has engaged the feedback-software controls, the application add-on 118 also provides a mechanism to capture and send user feedback to the user feedback server 108.

Figure 1D:
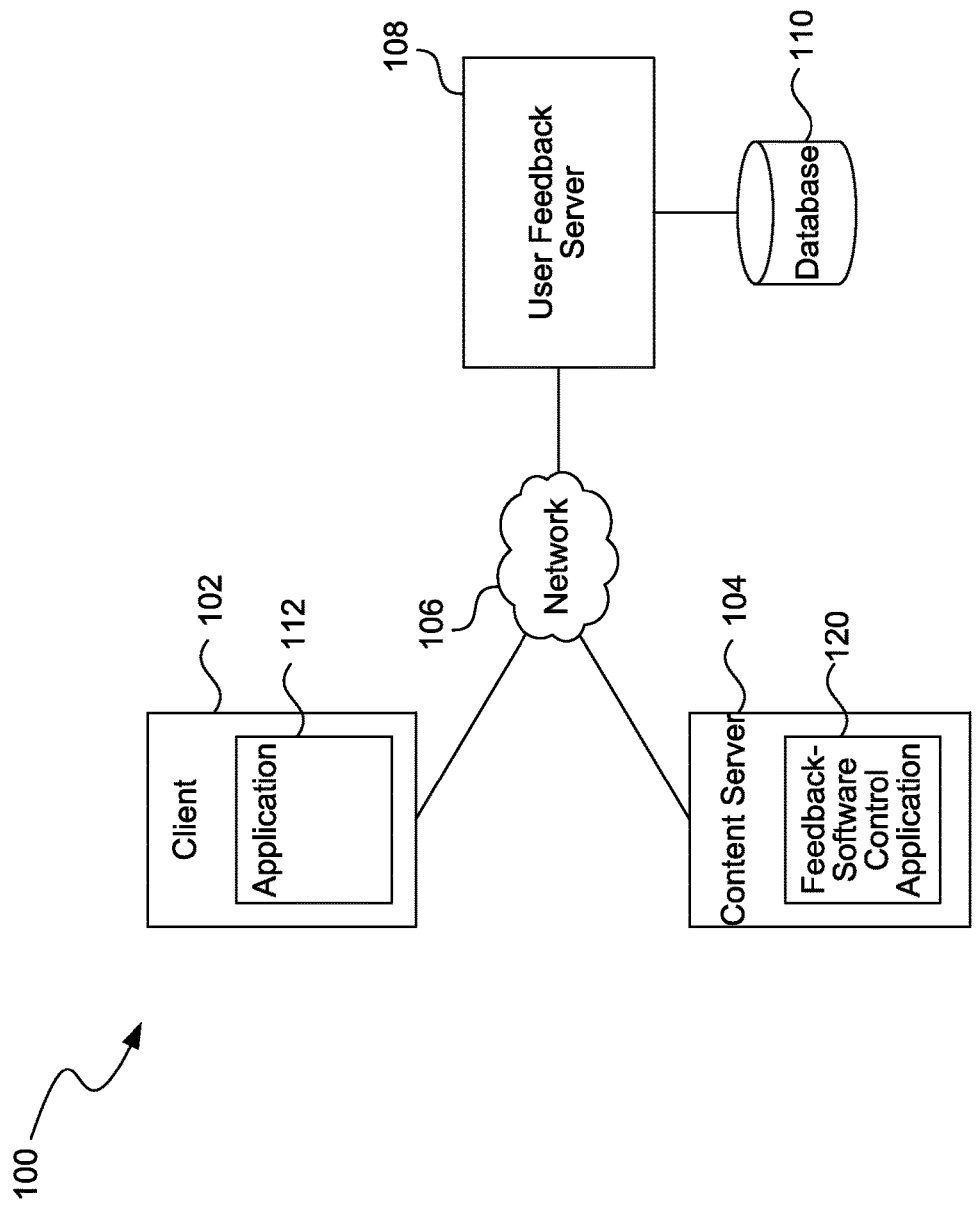
FIG. 1D is a block diagram of an example network environment including a server side application in which the techniques described herein can operate.

FIG. 1D is a block diagram of an example network environment including a server side application in which the techniques described herein can operate. In one embodiment, the feedback-software controls can be implemented by a server side application 120 provided by the content server 104. In the example of FIG. 1D, the server side application 120 implements the feedback-software controls user interface. In one embodiment, the server side application 120 includes a mechanism, e.g., an event listener, to monitor user interaction with the feedback-software control interface. In response to detecting that the user has engaged the feedback-software controls, the server side application 120 also provides a mechanism to capture and send user feedback to the user feedback server 108.

Figure 2A:
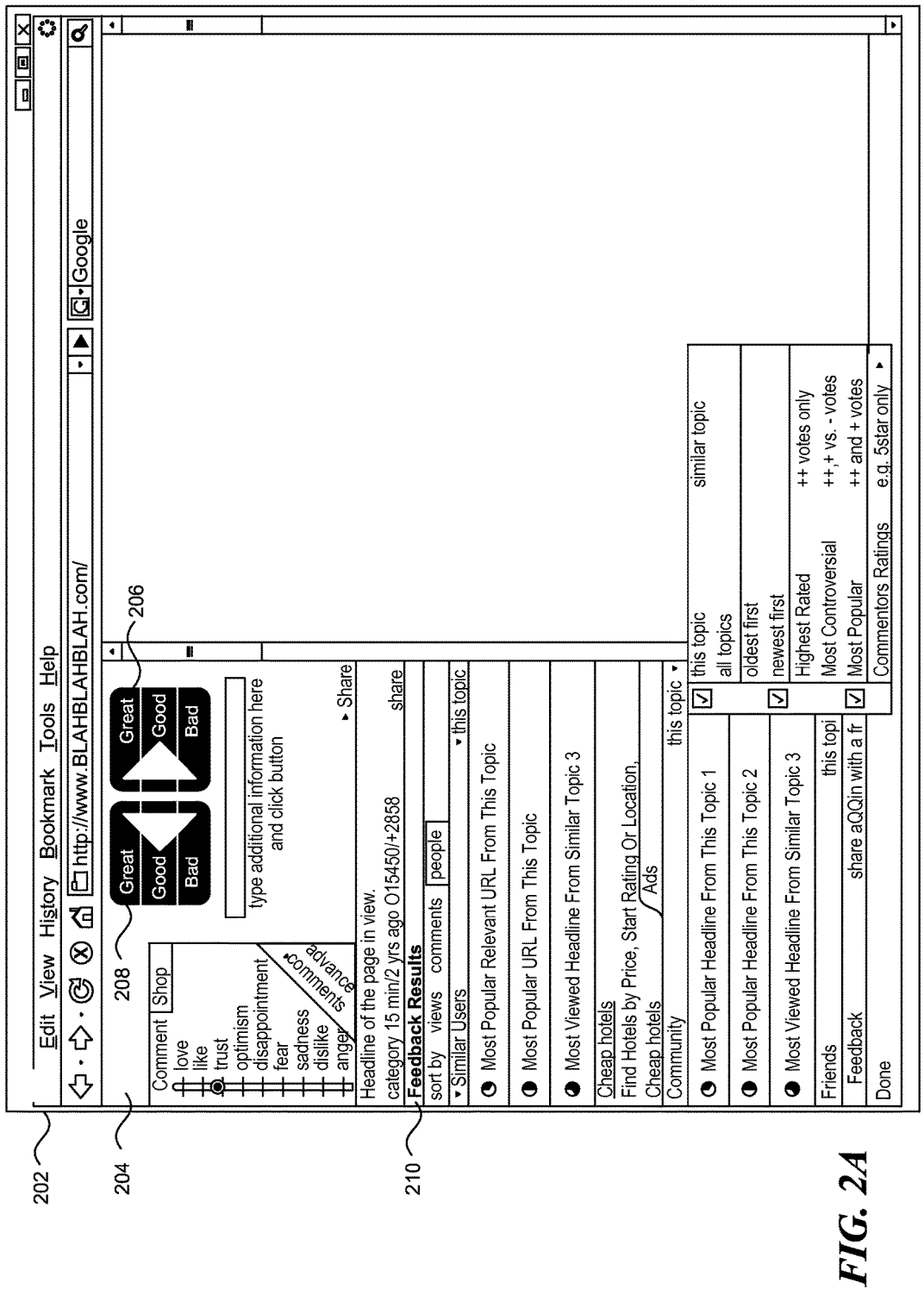
FIG. 2A is a screenshot of an example application including feedback-software controls.
Figure 2B:
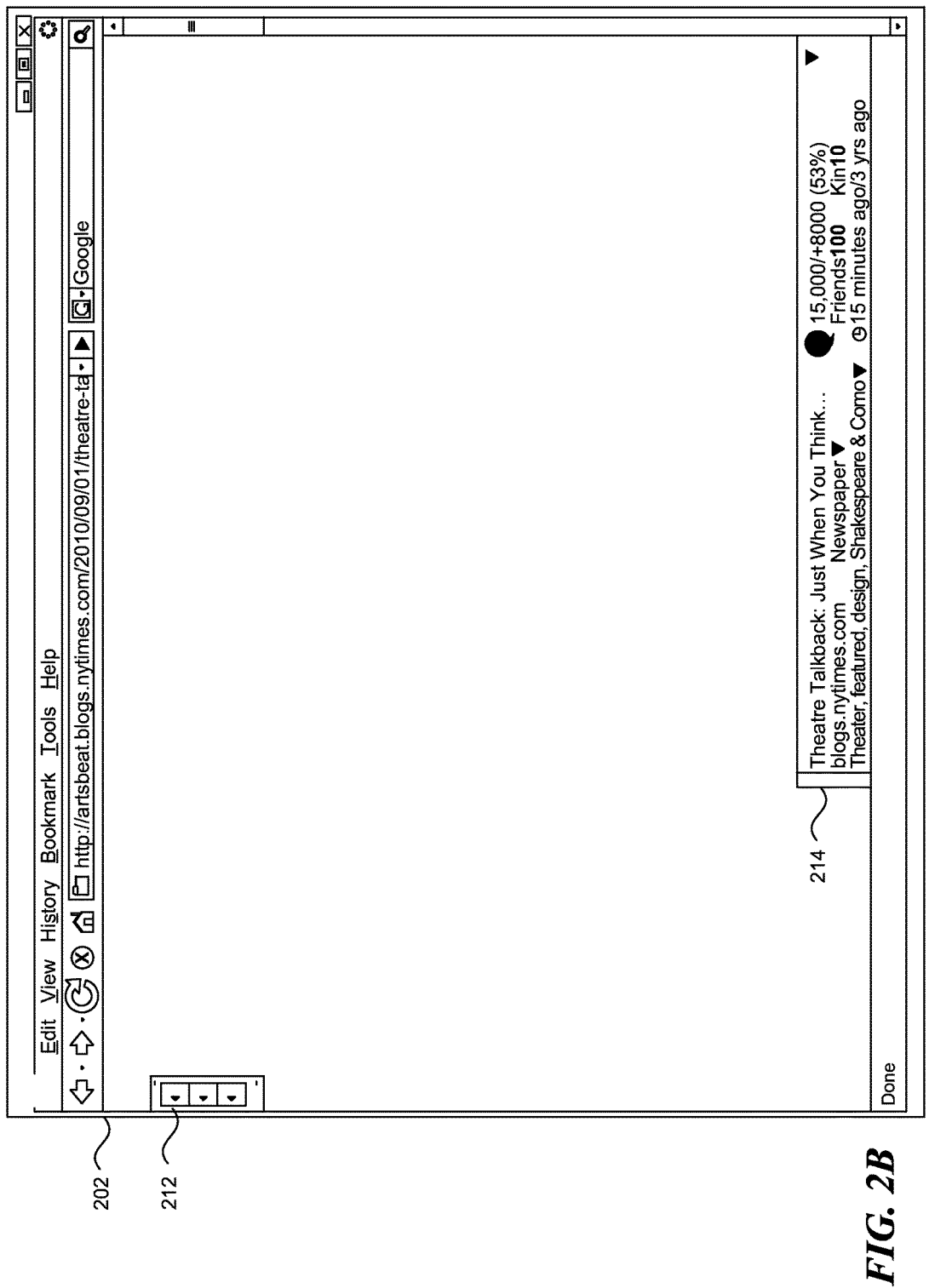
FIG. 2B is a screenshot of an example application including feedback-software controls.

In one embodiment, the server side application 120 also provides a mechanism to control the client application 112. For example, the feedback-software controls can be implemented by a server script that is installed and runs on the web page provided by the content server 104. The feedback-software controls can be implemented (e.g., provided by the server script) as page embedded buttons, such as individual buttons, combination buttons, toolbar/toolbox buttons, and/or mini buttons. The buttons can float or be located in fixed positions within the client application window FIG. 2 is a screenshot of an example application including feedback-software controls. In the example of FIG. 2, the application 202 is an internet browser that is running an add-on that implements the feedback-software controls 204 in a side-bar. While the example of FIG. 2 shows the feedback-software controls 204 implemented as a side-bar, one of skill in the art will appreciate that other placement and/or arrangement of the feedback-software controls are possible. For example, the example of FIG. 2B shows the feedback-software controls as a floating module 212 that can be displayed in any portion of the application 202.

The feedback-software controls 204 include a mechanism 206 to control the application 202 and capture user feedback in a single user action. For example, in operation, if a user who is visiting a web page wants to return to a previous page while at the same time rating the content of the current page favorably, the user can engage the feedback-software controls on the positive area of the back button 208. The feedback-software controls can provide, for example, the option for a user to rate the content negatively or positively and follow a link to different content, rate the content negatively or positively and continue to view the rated content, or rate the content negatively or positively and navigating to previously viewed content.

The feedback-software controls user interface 204 can also include a feedback results section 210. In one embodiment, feedback (e.g., ratings, recommendations, or comments) from other users displayed in the feedback results section 210. The example of FIG. 2B includes a floating window 214 that displays feedback results to the user. The feedback results can relate to the content being presented by the application 202 to the user. In other examples, the feedback results can be unrelated to the content presented but relevant to the user based on a user profile.

Figure 3A:
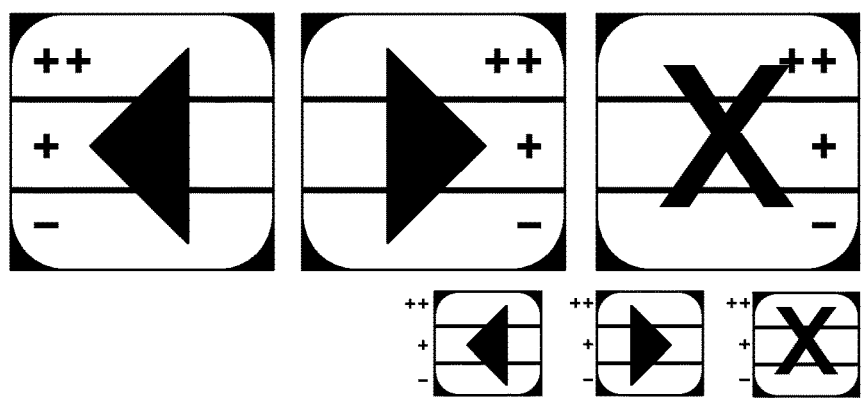
FIGS. 3A-3E are diagrams of example feedback-software control implementations.
Figure 3B:
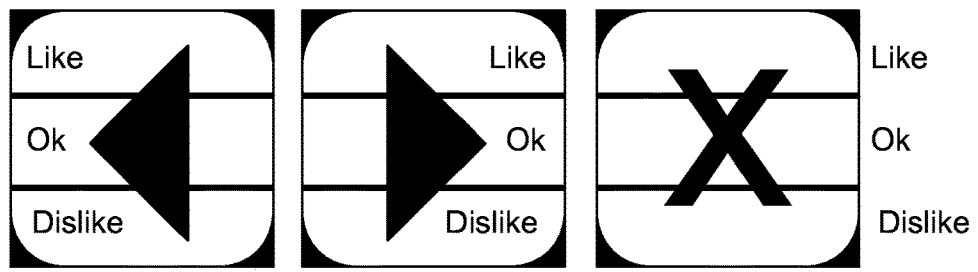
Figure 3C:
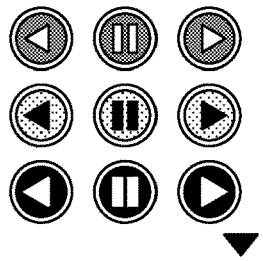
Figures 3D, 3E:

The feedback-software controls can take many forms, as should be apparent to one of skill in the art. For example, the controls can be implemented, as icons, symbols, text, or any combination of these or other features. In some examples, the feedback-software controls indicate various feedback options using symbols, text, colors, or combinations of all or some of these indicators. Also, in one embodiment, the controls can be audible and the feedback-software controls allow the user to provide commands by voice. FIGS. 3A-3E are examples of possible feedback-software control implementations. FIG. 3E shows feedback-software controls that can be implemented for controlling a media player, for example.

FIGS. 4A-4C are example diagrams of a user interacting with feedback-software controls. In the example of FIGS. 4A-4C, the example diagrams show a user interacting with part of the content displayed by the application. In FIG. 4A the user interacts with the part of the content, for example, a link 402 displayed in an Internet browser. In one example, the user interaction can be hovering over the link with a mouse cursor 404. In response to detecting the interaction with the link 402, the feedback-software controls 406 are displayed to the user. As described above, the feedback-software controls can be implemented by an Internet browser add-on, a script running on the content server, or a standalone application.

Referring now to FIG. 4B, the user interacts with the feedback-software controls to provide feedback regarding content and to control the application. In response to detecting interaction with the feedback-software controls, the feedback-software controls application displays more control options to the user. For example, the user in FIG. 4B is hovering the mouse cursor 404 over the button to follow the link and rate the content negatively 408 on the feedback-software controls 406. In response to detecting interaction by the user, the feedback-software controls application presents to the user more control options for rating and controlling the application. For example, a button to continue displaying the current content and rate the content negatively 410 and a button to go to the previous content and rate the content negatively 412 are displayed. In one embodiment, the feedback-software controls include a button to refresh the content currently being presented to the user.

Referring now to FIG. 4C, the user has now engaged the feedback-software controls, for example by clicking on a feedback-control button 414. In response to detecting that the user has engaged the feedback-software controls, the feedback-software controls application sends the feedback to the feedback server and controls the application displaying the content. In one embodiment, feedback results 416 are displayed to user, for example an information indicator 418 prompts the user to show that feedback results are available for viewing. The feedback results can be generated based on the user feedback history, content in view, feedback history and preferences of other users, demographics and other similar factors.

Figure 5:
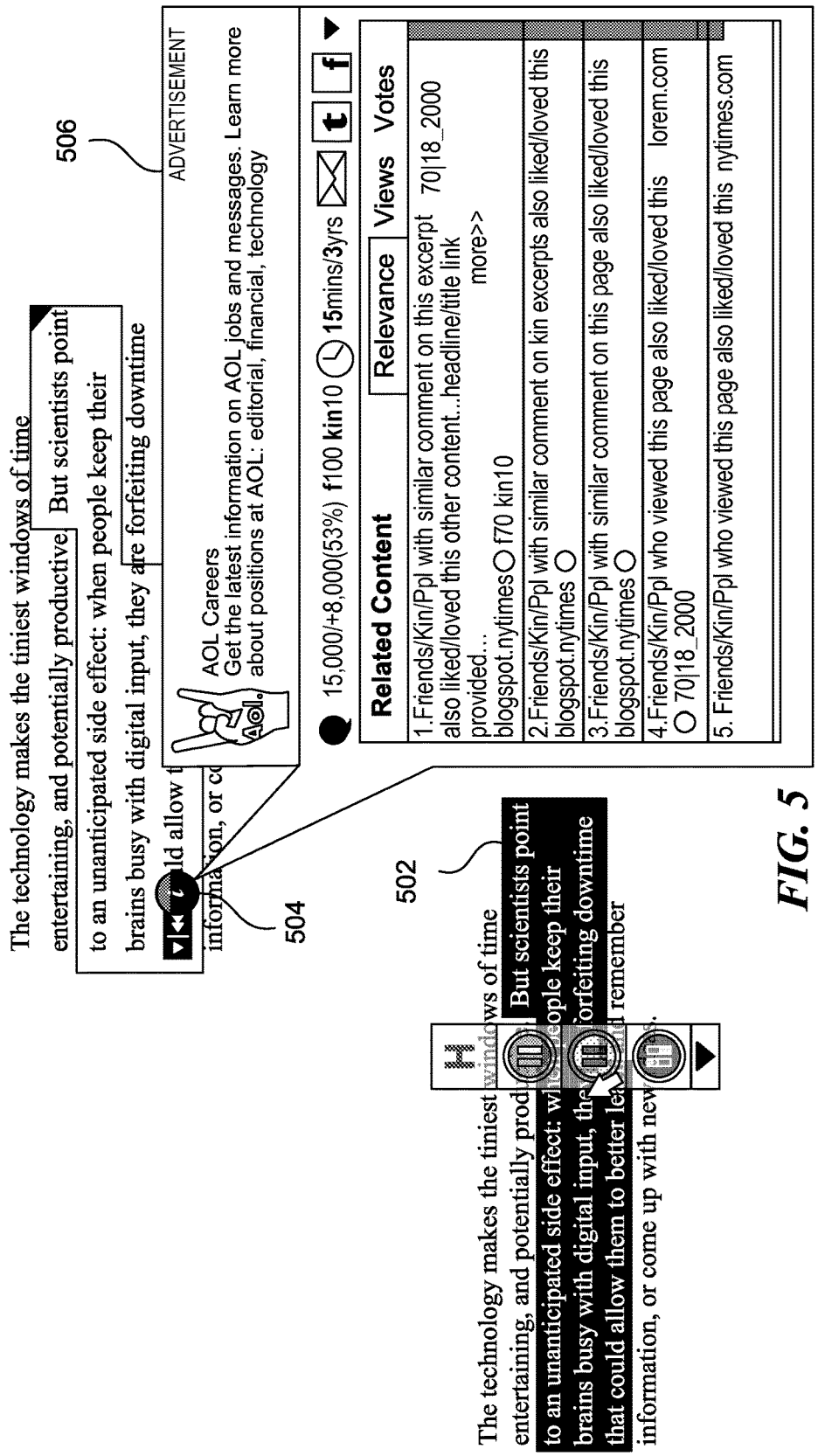
FIG. 5 is an example diagram of a user interacting with feedback-control software.

FIG. 5 is an example diagram of a user interacting with feedback-control software. FIG. 5 provides another example of a user interacting with part of the content presented by the application. The example of FIG. 5 however, shows the user interacting with a highlighted section of the content 502 instead of the link displayed in an Internet browser. Feedback results 506 for the highlighted content 502 can be displayed to the user. In some examples, the information indicator 504 can include an relevancy and/or ranking indicator that shows how relevant the feedback results are to the highlighted content 502 or how the content ranks in popularity or usefulness, for example.

Figure 6:
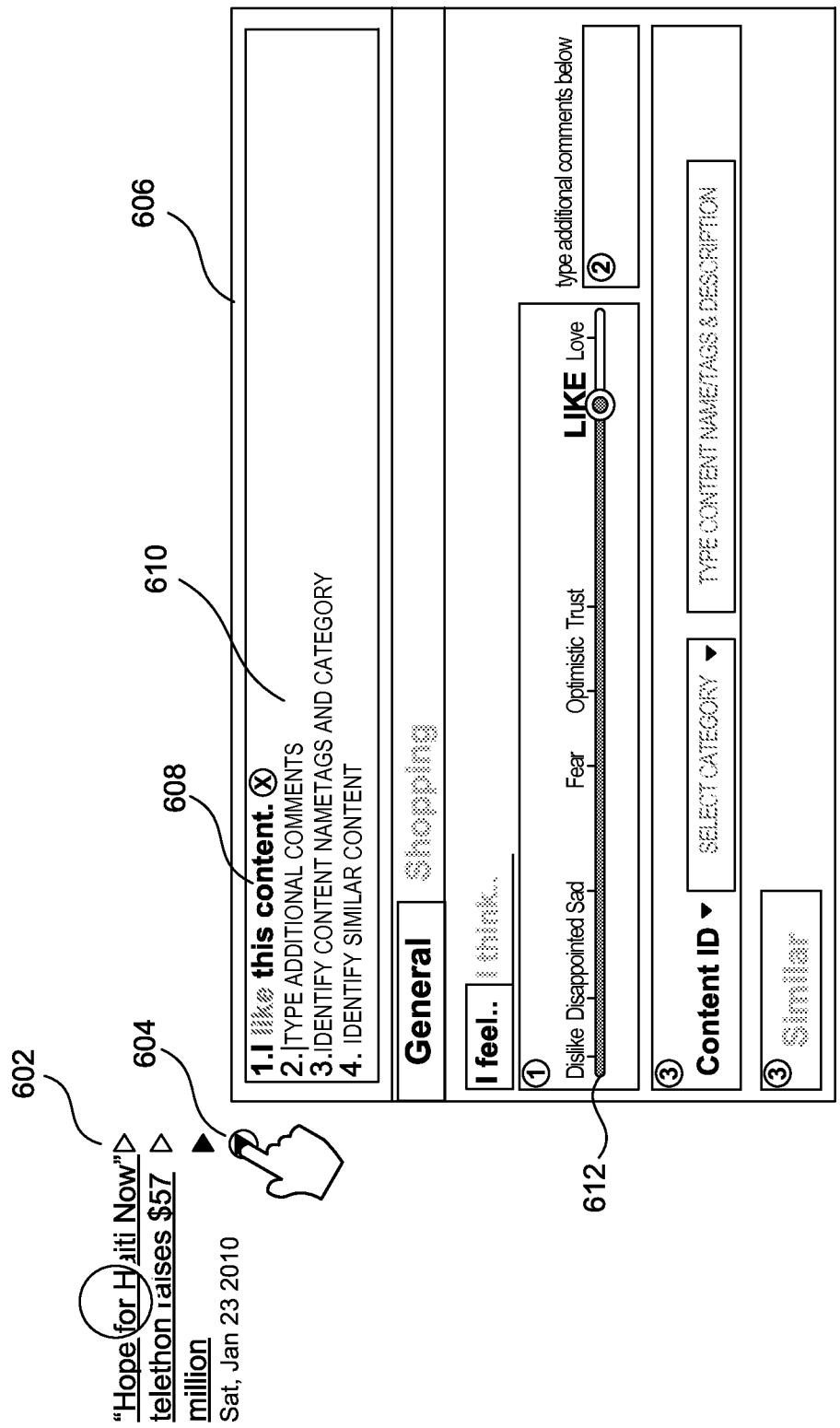
FIG. 6 is an example diagram of a user interacting with an advanced feedback feature of the feedback-software controls.

FIG. 6 is an example diagram of a user interacting with an advanced feedback feature of the feedback-software controls. In the example of FIG. 6, the user is interacting with part of the content presented in the client application. The feedback-software controls of FIG. 6 include advanced comment feature. In response to detecting the user interaction with the advanced comment button, the feedback-software controls application presents the advanced comment feature to the user. The advanced comment feature includes a defined comment, space to provide user-defined comments, and a user comment graph. The probability of a user providing insightful feedback is increased by providing a comment graph that facilitates fast and easy comment construction using predetermined phrases/words.

Figure 10:
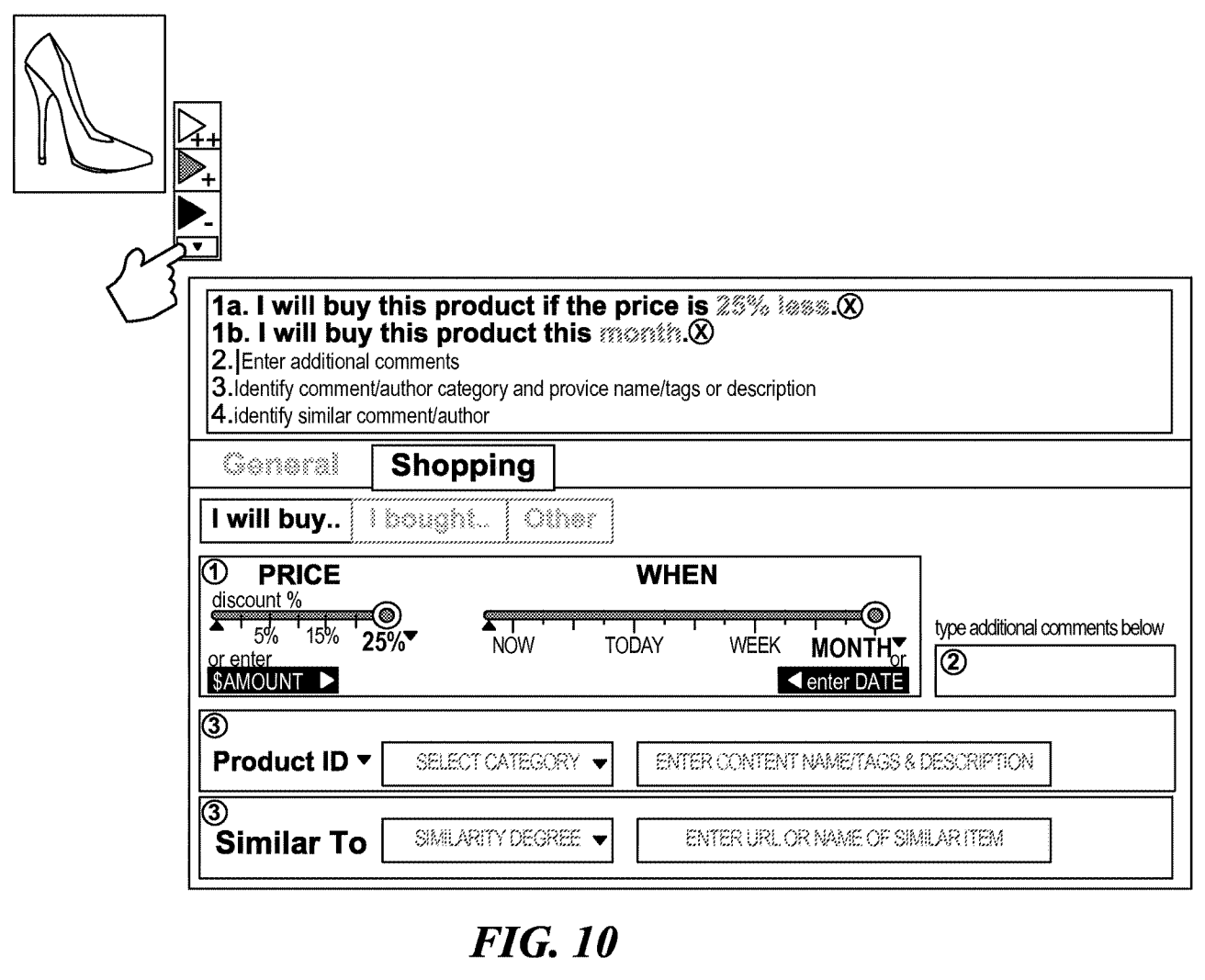

The advanced comment feature of FIG. 6 allows a user to provide more granular feedback relating to the content being viewed. Further, the advanced comment feature can be tailored to the content being displayed to the user. For example, if a user is visiting a shopping website using an Internet browser, the advanced comment feature can provide comments/recommendations specific to shopping, and in some cases, specific to the product being viewed by the user. FIG. 10 is an example diagram of a user interacting with an advanced feedback feature of the feedback-software controls on a shopping site.

Figure 7:
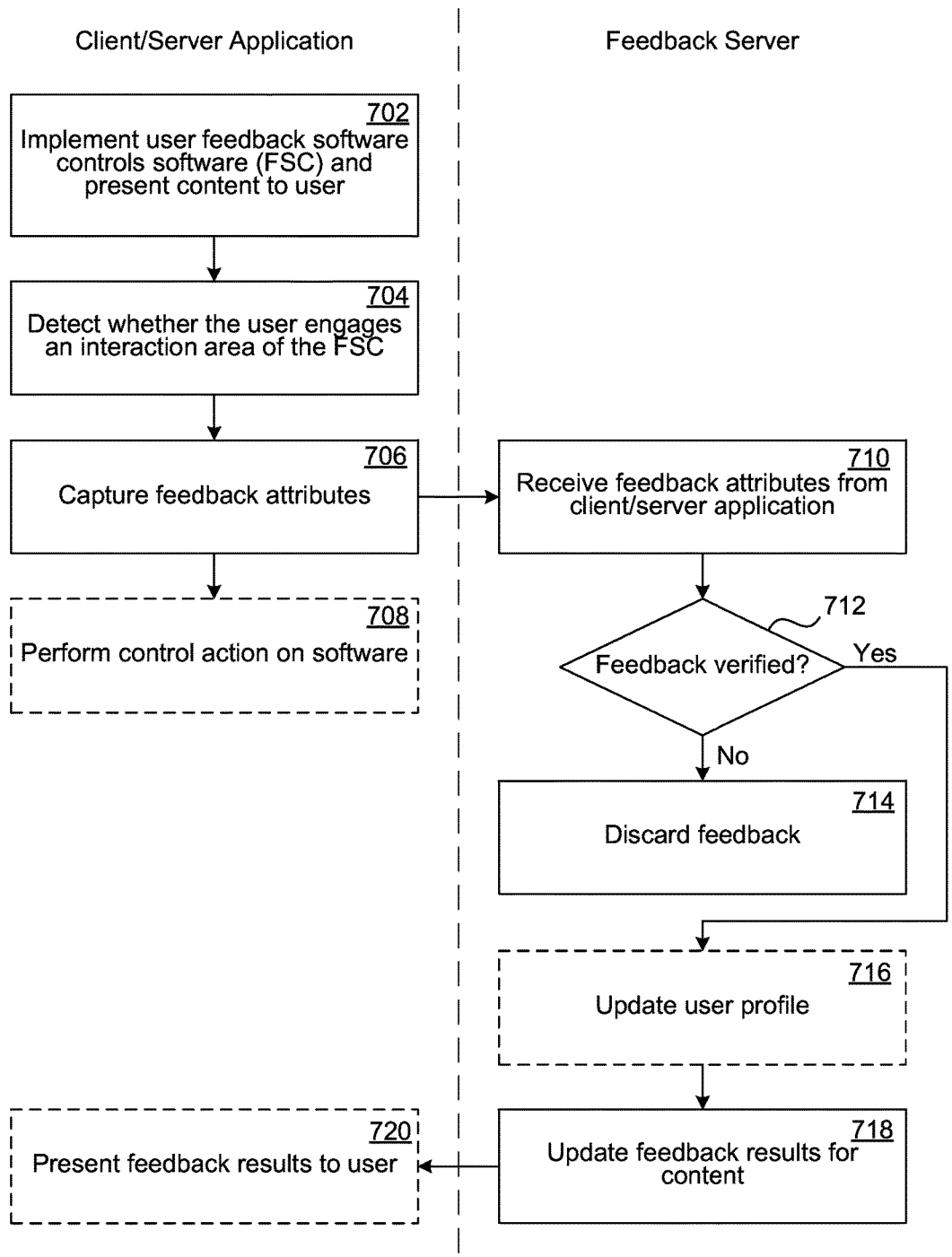
FIG. 7 is a flow diagram of an example user interaction with feedback-software controls.

FIG. 7 is a flow diagram of an example user interaction with feedback-software controls. In one embodiment, in the example of FIG. 7, the feedback-software controls are implemented by an add-on to a client application or a standalone application interfacing with the client application. In another embodiment, in the example of FIG. 7, the feedback-software controls are implemented by a feedback-software controls application running on a content server. In either case, at step 702, the feedback-software controls application implements the feedback-software controls user interface and presents an interface to the user. The client application also displays the content to the user. At step 704, the feedback-software controls application detects whether the user engages in interaction area of the feedback-software controls. As described above, the feedback-software controls application can detect whether the user engages only a part of the content displayed by the client application, and therefore the feedback only corresponds to that part of the content, or whether the feedback corresponds to the entire content being displayed.

At step 706, in response to detecting whether the user engages and interaction area of the feedback-software controls, the feedback-software controls application captures feedback attributes relating to the content being presented to the user. For example, the feedback attributes can include, for example, user control actions, content attributes (e.g., URL, heading, title, font, links, or other metadata), user ID attributes, network attributes, timestamps, user comments, user ratings, or any manner of data useful for feedback. In one embodiment, as described above, the feedback-software controls provide options for a user to provide advanced feedback. For example, a graph or dialogue box can allow the user to select a phrase or input text that describes the user's opinion of the content. This advanced option provides more robust feedback to better assist users to find appropriate content as well as merchants and content providers to better target what users prefer.

At step 708, if the user has selected an option to control the software, the client application performs the control action, for example, navigating to previously viewed content or opening new content. In some examples, the user interaction with the feedback-software controls can include a command to continue displaying the content currently being displayed by the client application. In one embodiment, the feedback-software controls include a button to refresh the content currently being presented to the user.

At step 710, the user feedback server receives the feedback attributes from the feedback-software controls application. The user feedback server, at step 712, determines whether the feedback received from the feedback-software controls application is verified. This verification step can be important to prevent spammers from manipulating the system. A more detailed process of feedback verification is described in more detail below with reference to FIG. 8.

At step 714, if the user feedback server is unable to verify the feedback, the feedback is discarded. If the user feedback server is able to verify the feedback and the user has created a user profile, the user feedback server updates the user profile with the received feedback attributes at step 716. In some examples, it is not necessary for a user to create user profile to take advantage of the feedback-software controls. At step 718, the user feedback server updates the database with the received feedback attributes. As described above, in some examples, the feedback-software controls application receives results from the user feedback server. At step 720 the feedback results are presented to the user.

Figure 8:
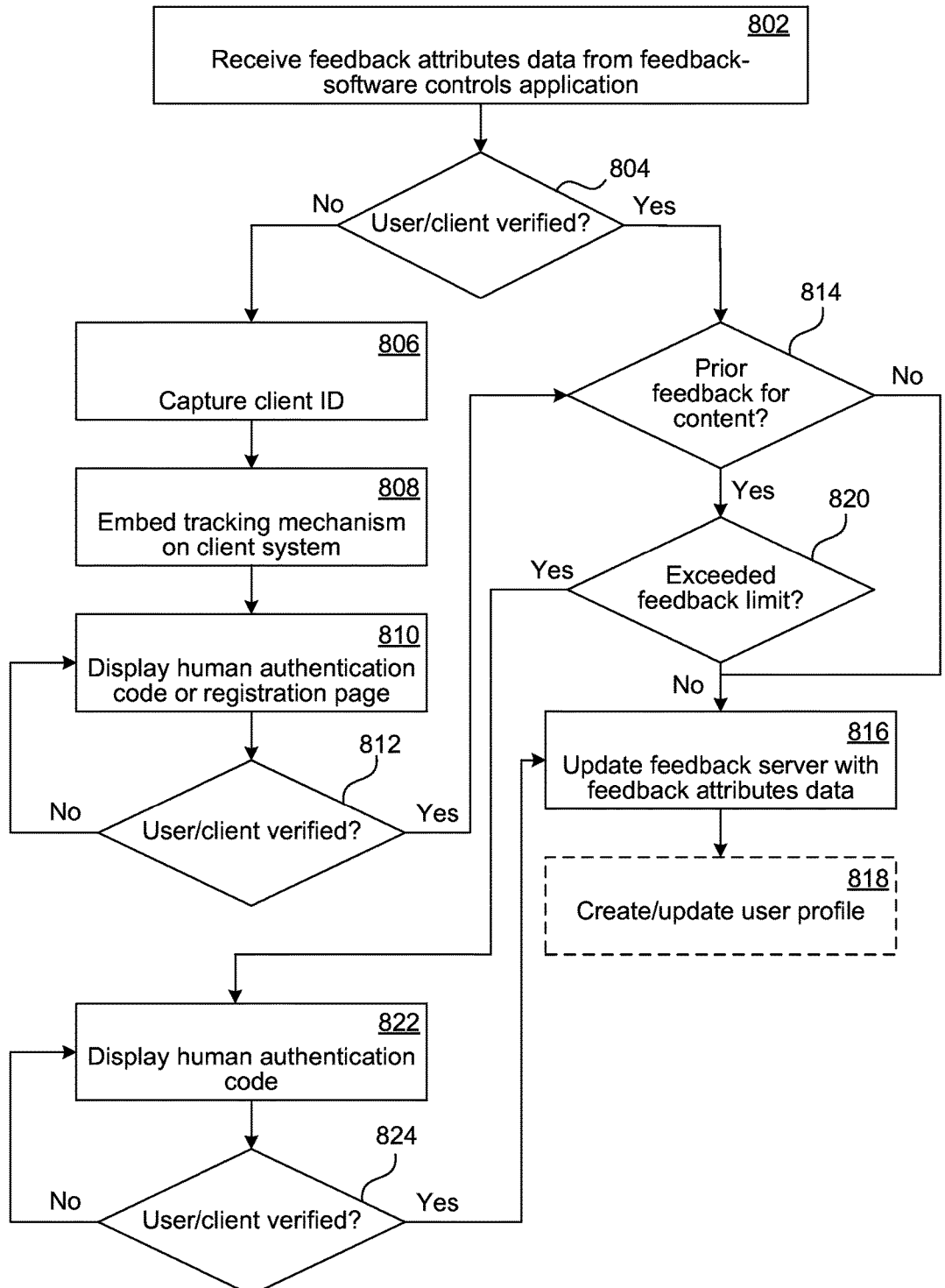
FIG. 8 is a flow diagram of an example process for verifying feedback provided by user.

FIG. 8 is a flow diagram of an example process for verifying feedback provided by user. The process begins at step 802 when the user feedback server receives feedback attributes data from the feedback-software controls application. At step 804, user feedback server determines whether the user or the client application that the user is interacting with is verified. The user feedback server can determine whether the user or client application is verified if, for example, the user has signed in with the current user profile or has previously submitted feedback using the client application.

If the user feedback server is unable to verify the user or the client application, at step 806 the user feedback server captures a client ID, for example, the user's IP address. The client ID can be stored by the user feedback server to verify the user or the client application in the future. At step 808, to further help in verifying future feedback provided by the client system, a tracking mechanism, such as a cookie, is embedded in the client application.

In one embodiment, to prevent a machine implemented spamming attack, at step 810, the user feedback server presents a human authentication code (e.g., a Captcha code) to the user. The user feedback server can present, along with or in lieu of the human authentication code, a user registration form that allows the user to create an account. At 812, the user feedback server determines whether the user has provided the correct code or has registered an account. If the user has failed to provide the correct code or register an account, the user feedback server can again display the registration form and/or the human authentication code. This process can be repeated until the user provides a valid response or, in some examples, a fixed number of unsuccessful attempts have been made.

If the user does provide a valid response to the human authentication code or registers an account the process continues at step 814 where it is determined whether the user has previously provided feedback for the content currently being displayed by the client application. If the user has not previously provided feedback for the content currently being displayed by the client application, at step 816, the user feedback server updates the database with the feedback attributes data received from the feedback-software controls. At step 818, if the user has registered an account, the user feedback server can update the account of a previously registered user or create and update an account for a newly registered user.

Returning to step 814, if the user feedback server determines that the user has previously rated the content displayed by the client application, the user feedback server, at step 820, determines whether the user has exceeded the limit for the number of times that a user can provide feedback for the content. If the user feedback server determines that the user has not exceeded the limit, the process continues with step 816 as described above.

If the user feedback server determines that the user has exceeded the limit, at step 822, the user feedback server can cause another human authentication code to be displayed to the user. If the user successfully responds to the human authentication code, at step 824, the process continues with step 816 as described above. However, if the user does not successfully respond to the human authentication code, at step 824, the user feedback server can cause a new human authentication code to be displayed to the user. This process can be repeated indefinitely or for a fixed number of attempts. If the user fails to successfully respond within the fixed number of attempts the feedback attributes are discarded. In one embodiment, if a user has exceeded the limit for the number of times feedback can be provided for the content, the process is terminated and the feedback attributes provided to the user feedback server can be discarded.

Figure 9:
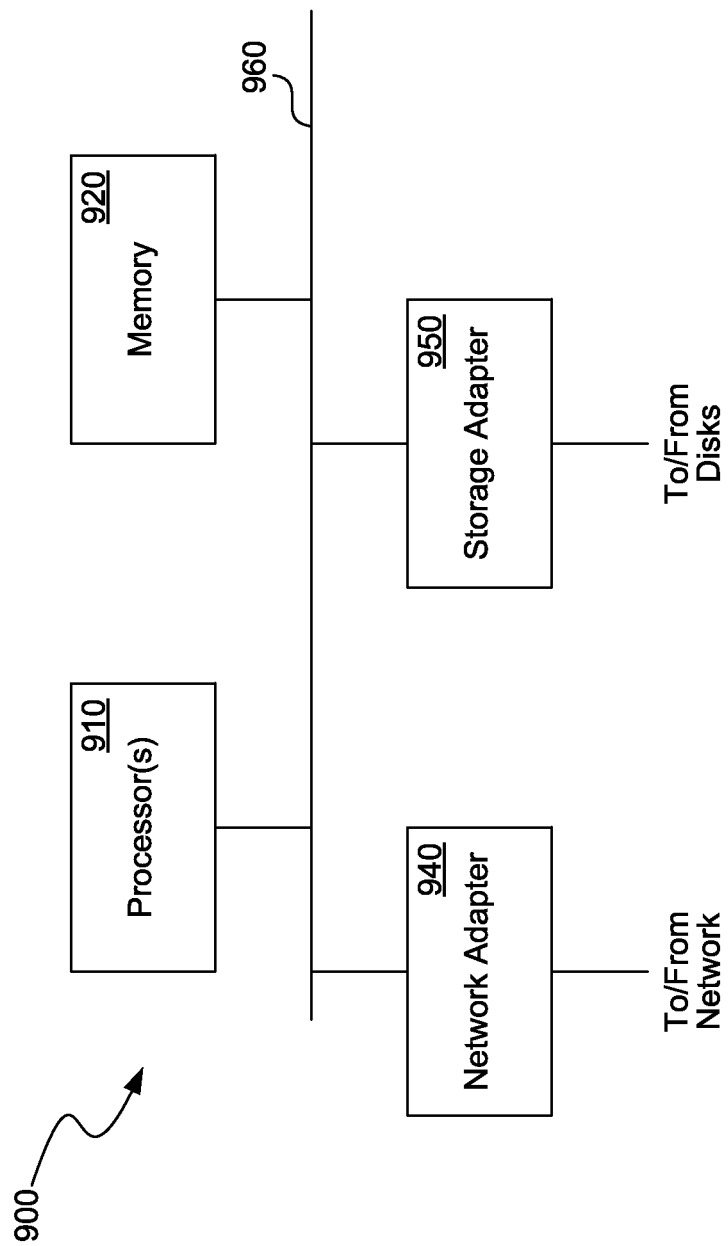
FIG. 9 is a block diagram of a system that can be used to implement components of a network environment.

FIG. 9 is a block diagram of a system 900 that can be used to implement components of a network environment. For example, the system of FIG. 9 can be used to implement a client system, the content server, or the user feedback server.

In an illustrative embodiment, the system 900 includes a processor subsystem 910 that includes one or more processors. The system 900 further includes memory 920, a network adapter 940, and a storage adapter 950, all interconnected by an interconnect 960.

The memory 920 illustratively comprises storage locations that are addressable by the processor(s) 910 and adapters 940 and 950 for storing software program code and data associated with the techniques introduced here. The processor 910 and adapters 940 and 950 may, in turn, comprise processing elements and/or logic circuitry configured to execute the software code and manipulate the data structures. It will be apparent to those skilled in the art that other processing and memory implementations, including various computer readable storage media, may be used for storing and executing program instructions pertaining to the techniques introduced here.

The network adapter 940 includes a plurality of ports to couple the system 900 with one or more other systems over point-to-point links, wide area networks, virtual private networks implemented over a public network (Internet) or a shared local area network. The network adapter 940 thus can include the mechanical components and electrical circuitry needed to connect the system 900 to the network 106. Illustratively, the network 106 can be embodied as an Ethernet network or a Fibre Channel (FC) network. One or more systems can communicate with other systems over the network 106 by exchanging packets or frames of data according to pre-defined protocols, such as TCP/IP.

The storage adapter 950 cooperates with the operating system to access information on attached storage devices. The information may be stored on any type of attached array of writable storage media, such as magnetic disk or tape, optical disk (e.g., CD-ROM or DVD), flash memory, solid-state drive (SSD), electronic random access memory (RAM), micro-electro mechanical and/or any other similar media adapted to store information, including data and parity information. The storage adapter 950 includes a plurality of ports having input/output (I/O) interface circuitry that couples with the disks over an I/O interconnect arrangement, such as a conventional high-performance, Fibre Channel (FC) link topology.

The foregoing processes are depicted as flow charts of ordered steps. However, it should be understood that at least some of the operations associated with these processes can potentially be reordered, supplemented, or substituted for while still performing the same overall technique.

The techniques introduced above can be implemented by programmable circuitry programmed or configured by software and/or firmware, or they can be implemented by entirely by special-purpose "hardwired" circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware for implementing the techniques introduced here may be stored on a machine-readable storage medium and may be executed by one or more general-purpose or special-purpose programmable microprocessors. A "machine-readable medium," as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic," as used herein, can include, for example, special-purpose hardwired circuitry, software and/or firmware in conjunction with programmable circuitry, or a combination thereof.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

The invention claimed is:

1. A method for capturing user feedback of content in a network environment, the method comprising:
    implementing a user interface for a software application on a computer, wherein the user interface includes a single control button that allows a user to control a given feature of the software application,
    wherein the control button is coupled to a one controlling part and to at least one feedback part, such that the control button is operable to, with a single engagement of the control button: (1) issue a control command designated to the one controlling part, and (2) transmit at least one feedback designated to the at least one feedback part based on a directionality of engagement of the control button;
    upon the user engaging the control button, performing both (1) transmitting, to a feedback receiver, the at least one feedback designated to the at least one feedback part, and (2) issuing the control command to the application or a content provider; and
    providing feedback results based on the at least one feedback, the feedback results providing information related to the content provided by the software application.

2. The method of claim 1, wherein the control button is coupled to more than one feedback parts, each feedback part is coupled to a different section of the control button, so that the control button is operable to transmit a different feedback depending on which section of the control button is engaged.

3. The method of claim 1, further comprising:
    collapsing all control buttons that have the same feedback into a group.

4. The method of claim 3, further comprising:
    detecting a user interaction with the group from the user; and
    upon the user interaction with the group being detected, expanding the collapsed control buttons from the group to display each control button in the group to the user.

5. The method of claim 1, further comprising:
    detecting a user interaction with a target content from the user; and
    upon the user interaction with the target content being detected, causing the user interface to be displayed to the user.

6. The method of claim 5, wherein the predetermined interaction comprises hovering over the target content with a cursor of an input device.

7. The method of claim 5, wherein the predetermined interaction comprises clicking on the target content with a button of an input device, wherein the target content comprises a web link, and wherein the button of the input device is not designated to directly activate the web link.

8. The method of claim 5, wherein the predetermined interaction comprises highlighting the target content with a cursor of an input device.

9. The method of claim 8, wherein the predetermined interaction further comprises clicking on the highlighted target content with the input device.

10. The method of claim 1, further comprising:
displaying additional content based on the transmitted feedback.

11. The method of claim 10, wherein the additional content comprises feedback of another user on the content.

12. The method of claim 10, wherein displaying additional content is further based on a user profile.

13. The method of claim 10, wherein the additional content is displayed in an area separate from the user interface, the method further comprising:
displaying an icon representing an existence of the area;
concealing the area from a view of the user;
detecting a user interaction with the icon from the user; and
upon the user interaction with the icon being detected, causing the area to be displayed to the user.

14. The method of claim 13, wherein the area further includes a plurality of predefined comments that are selectable by the user.

15. The method of claim 1, wherein the user interface is implemented as a part of a native interface of the software application.

16. The method of claim 1, wherein the user interface is implemented via a software in addition to and separate from the software application.

17. The method of claim 16, wherein the user interface provides control functionalities that are at least in part the same as control functionalities provided by a native interface of the software application.

18. The method of claim 1, wherein the user interface comprises a webpage.

19. The method of claim 1, wherein the user interface further includes a plurality of predefined comments that are selectable by the user.

20. The method of claim 1, wherein the user interface further includes a slider bar that enables the user to select a degree of interest or fondness for the content.

21. The method of claim 1, wherein the user interface is implemented as a floating panel capable of being relocated to be displayed at a location selected by the user.

22. The method of claim 1, further comprising:
updating a user profile based on the at least one feedback.

23. The method of claim 1, further comprising:
enabling the user to provide commands by voice to engage the control button.

24. The method of claim 1, wherein the software application comprises a web browser or a media viewer.

25. The method of claim 1, wherein the content provider comprises the feedback receiver.

26. A method for capturing user feedback of content in a network environment, the method comprising:
implementing a user interface for a software application on a computer, wherein the user interface includes a single control button that allows a user to control a given feature of the software application,
wherein the control button is coupled to a one controlling part and to at least one feedback part, such that the control button is operable to, with a single engagement of the control button: (1) issue a control command designated to the one controlling part, and (2) transmit at least one feedback designated to the at least one feedback part based on a directionality of engagement of the control button;
upon the user engaging the control button, performing both (1) transmitting, to a feedback receiver, the at least one feedback designated to the at least one feedback part, and (2) issuing the control command to the application or a content provider; and
providing feedback results based on the at least one feedback, the feedback results providing information related to the content provided by the software application.

27. A method for capturing user feedback of content in a network environment, the method comprising:
implementing a user interface for a software application on a computer, wherein the user interface includes a single control button that allows a user to control a given feature of the software application,
wherein the control button is coupled to a one controlling part and to at least one feedback part, such that the control button is operable to, with a single engagement of the control button: (1) issue a control command designated to the one controlling part, and (2) transmit at least one feedback designated to the at least one feedback part based on a directionality of engagement of the control button;
upon the user engaging the control button, performing both (1) transmitting, to a feedback receiver, the at least one feedback designated to the at least one feedback part, and (2) issuing the control command to the application or a content provider; and
providing feedback results based on the at least one feedback, the feedback results providing information related to the content provided by the software application.

28. The method of claim 27, further comprising:
collapsing all control buttons that have the same feedback into a group.

29. The method of claim 28, further comprising:
detecting a user interaction with the group from the user; and
upon the under interaction with the group being detected, expanding the collapsed control buttons from the group to display each control button in the group to the user.

30. A method for capturing user feedback of content in a network environment, the method comprising:
implementing a user interface for a software application on a computer, wherein the user interface includes a single control button that allows a user to control a given feature of the software application,
wherein the control button is coupled to a one controlling part and to at least one feedback part, such that the control button is operable to, with a single engagement of the control button: (1) issue a control command designated to the one controlling part, and (2) transmit at least one feedback designated to the at least one feedback part based on a directionality of engagement of the control button;
upon the user engaging the control button, performing both (1) transmitting, to a feedback receiver, the at least one feedback designated to the at least one feedback part, and (2) issuing the control command to the application or a content provider; and
providing feedback results based on the at least one feedback, the feedback results providing information related to the content provided by the software application.

31. The method of claim 30, further comprising:
collapsing all control buttons that have the same feedback into a group.

32. The method of claim 31, further comprising:
  detecting a user interaction with the group from the user; and
  upon the under interaction with the group being detected, expanding the collapsed control buttons from the group to display each control button in the group to the user.

* * * * *